United States Patent Office 3,388,893
Patented June 18, 1968

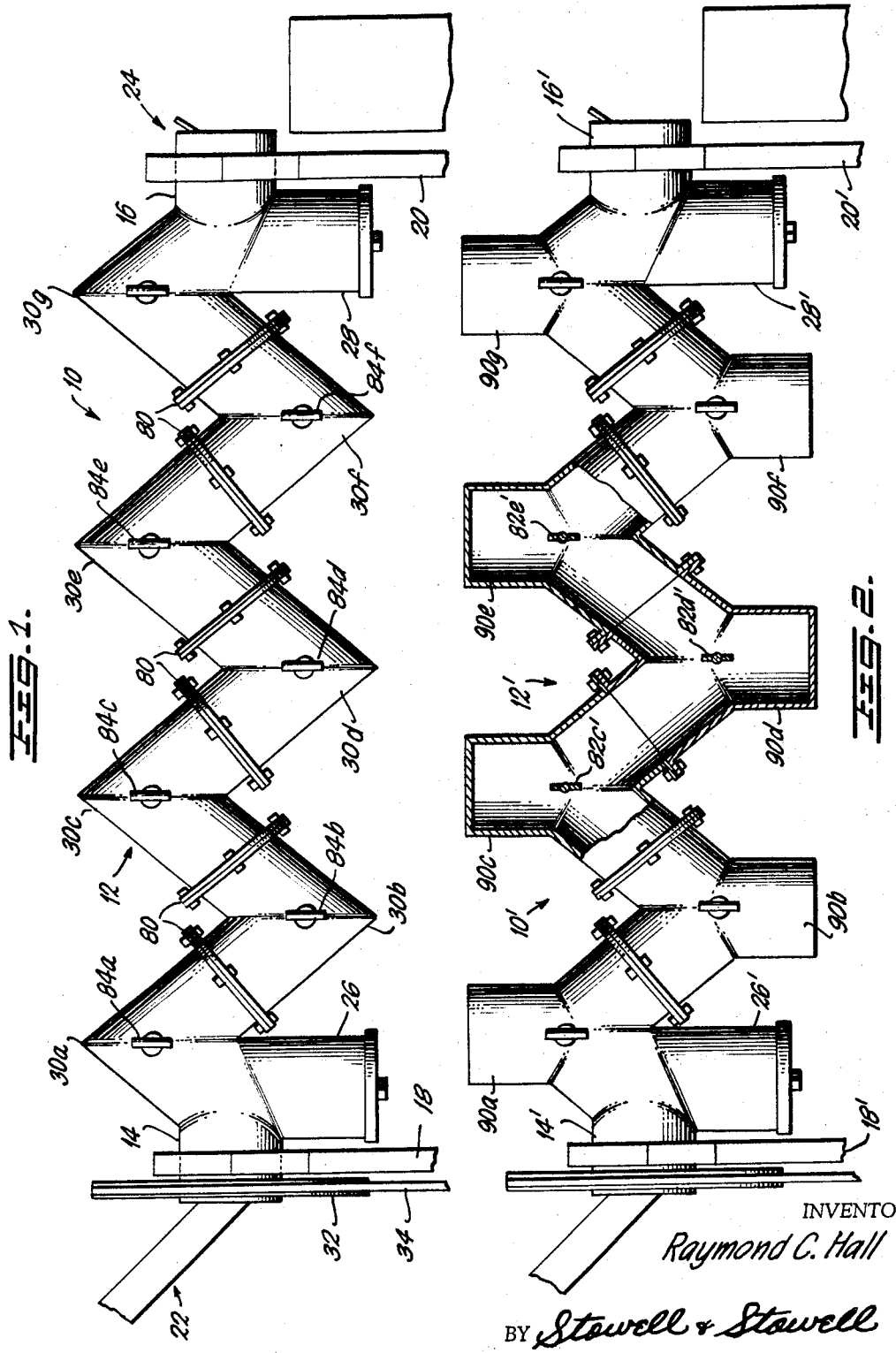

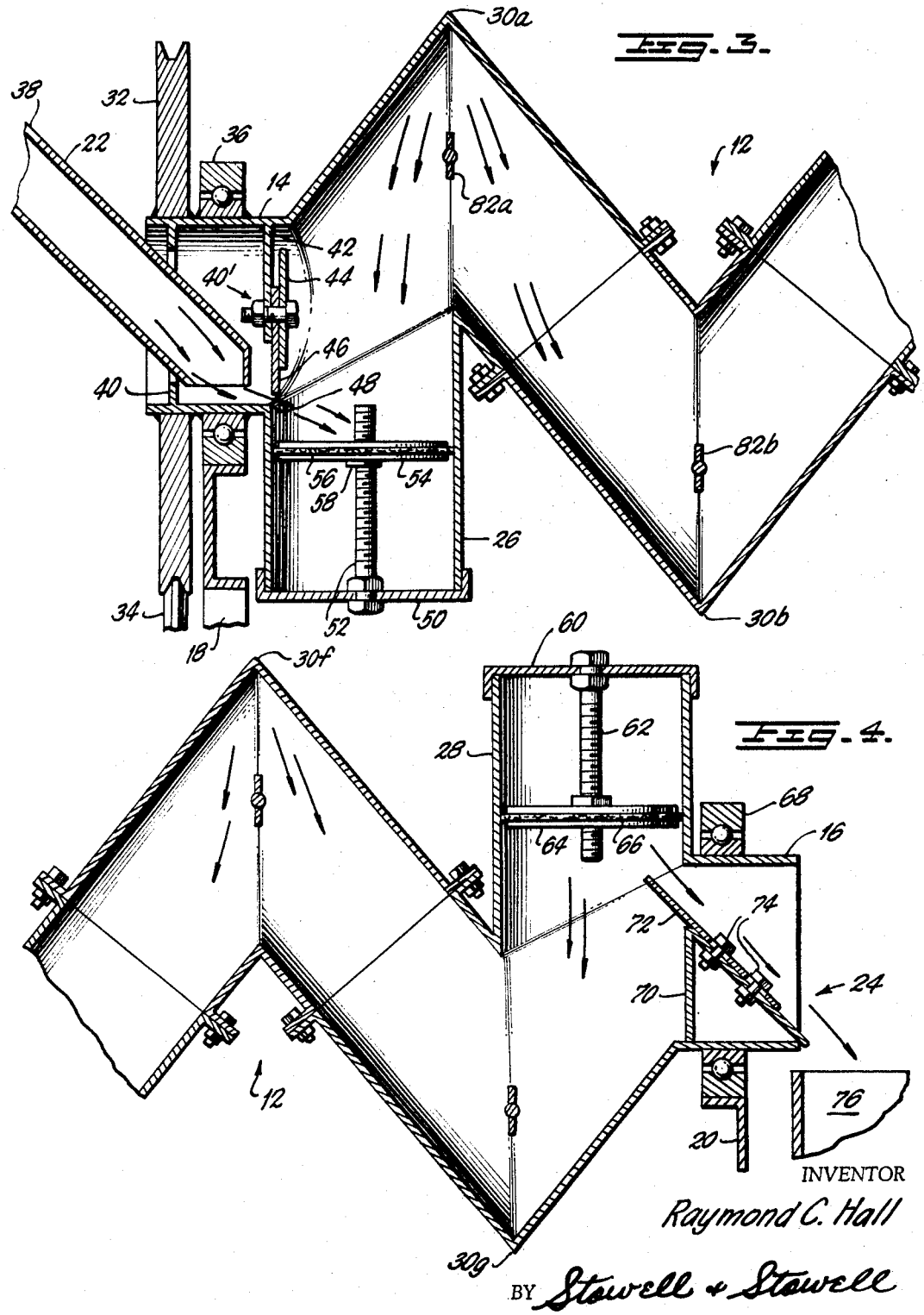

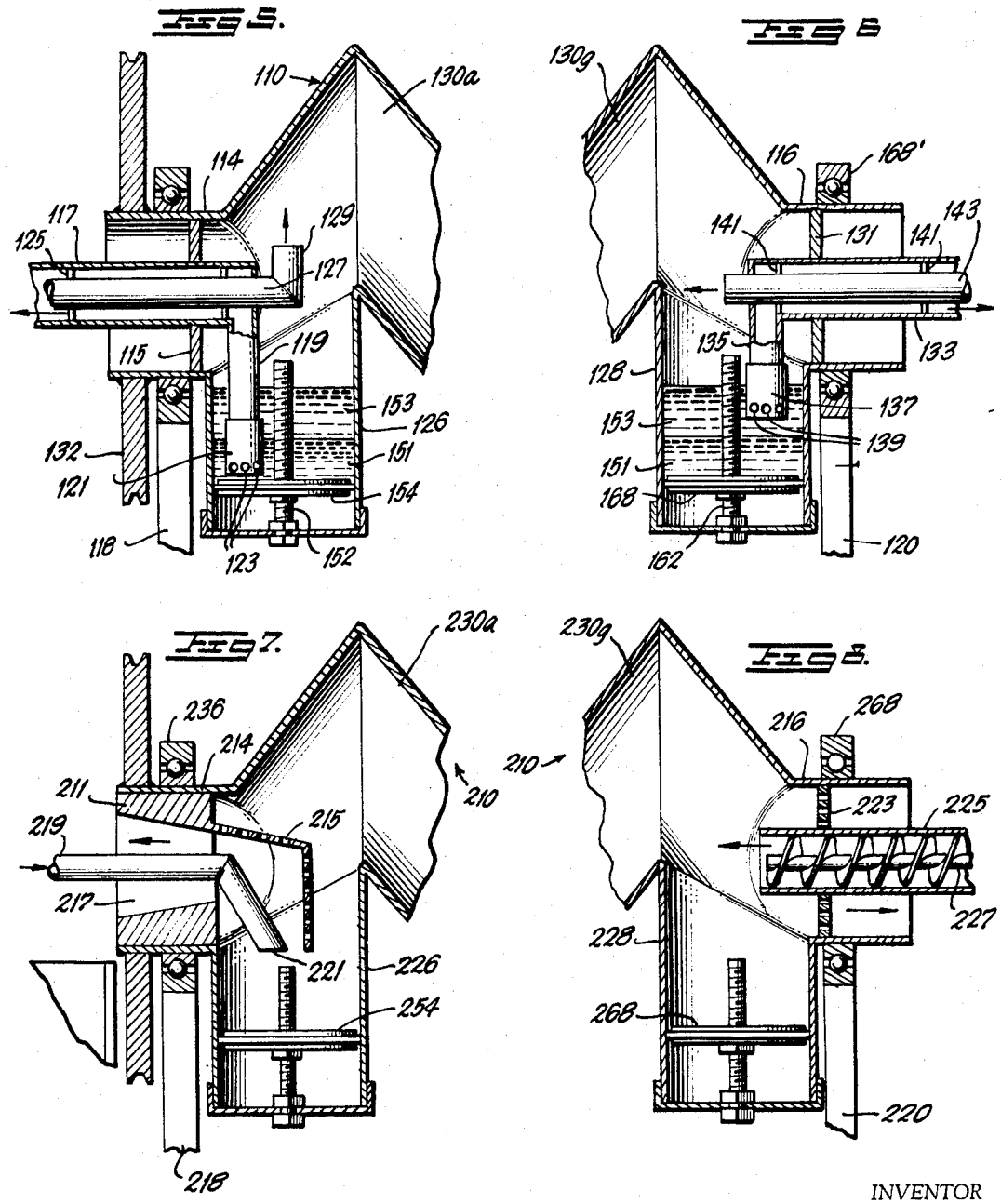

3,388,893
MATERIAL HANDLING DEVICE
Raymond C. Hall, 2121 Browning,
Manhattan, Kans. 66502
Filed Mar. 23, 1962, Ser. No. 182,021
13 Claims. (Cl. 259—3)

This invention relates to improvements in material handling devices and, in particular, to improvements in devices for continuous mixing of liquids, solids or gases or combinations thereof.

It is an object of the present invention to provide apparatus for continuously bringing together dissimilar particles to form a mass having generally uniform or homogeneous properties.

A further object is to provide such a device having substantial utility in extraction of substances from liquids, solids or gases.

A further object is to provide improvements in mixing or agitating devices having substantial utility as blenders, dryers, heaters or coolers for liquids, solids or gases.

In general, the invention comprises a continuous mixing device having an elongated material treating chamber, means for mounting the elongated material treating chamber for rotation about a generally horizontal axis, means for directing material into at least one end of the chamber, means for removing material from at least the other end of the chamber, the chamber comprising a plurality of blending zones serially arranged in end-to-end connection between the ends of the chamber, each of the blending zones being characterized by surface members directing portions of the material being treated toward opposite ends of the chamber upon rotation of the chamber and, further, the invention comprises a continuous mixing device including an assembly of casing members defining a plurality of substantially V-shaped channel sections joined end-to-end along a substantially horizontal axis, the sections projecting from the axis in successively different radial directions, means for directing material into one end of the mixing device, means for removing material from at least the other end of the mixing device, and means supporting the assembly for rotation about the substantially horizontal axis.

The invention will be more particularly described with reference to the illustrative embodiments thereof shown in the accompanying drawings wherein:

FIG. 1 is a side elevation of a mixing or blending device incorporating the features of the present invention;

FIG. 2 is a side elevation of a modified mixing or blending device with portions broken away to show the form of the channel sections which are joined in end-to-end relationship to provide the mixing chamber;

FIG. 3 is an enlarged fragmentary sectional view of one end of the device shown in FIG. 1 particularly adapted for feeding solid material into the mixing chamber;

FIG. 4 is an enlarged fragmentary sectional view of a discharge end of the device illustrated in FIG. 1 rotated 180° with respect to the position of the structures shown in FIG. 3;

FIG. 5 is a fragmentary sectional view similar to FIG. 3 illustrating feed and drawoff means having particular utility in a liquid-liquid mixer;

FIG. 6 is a view similar to that illustrated in FIG. 5 of the opposite end of the continuous mixer;

FIG. 7 is a fragmentary sectional view of a further form of feed and drawoff means having particular utility in a liquid-solid mixing device; and FIG. 8 is a fragmentary sectional view of the opposite end of the device employing the end member illustrated in FIG. 7.

Referring to the drawings and, in particular, to FIGS. 1, 3 and 4, 10 generally designates a continuous mixing device comprising an elongated material treating chamber or assembly of casings 12. The novel elongated chamber 12 is mounted for rotation on cylindrical end or hub members 14 and 16 journaled in generally stationary support elements 18 and 20. Outboard of the support members 18 and 20, the cylindrical end members 14 and 16 have communication with material feed and/or material withdrawing means designated 22 and 24 at ends 14 and 16, respectively.

Inboard of each of the support members 18 and 20 are material receiving and/or material discharge chambers 26 and 28 which will be more fully described hereinafter.

Between chambers 26 and 28, in the form of the invention illustrated in FIGS. 1, 3 and 4, there are a plurality of casing members 30a, b, c, d, e, f and g which define a plurality of substantially V-shaped channel members. The channel members are joined in end-to-end arrangement to provide the elongated material treating chamber having the plurality of blending zones which are serially arranged to direct portions of the material being treated toward opposite ends of the chamber upon rotation of the chamber.

Means for rotating the device are illustrated as comprising a pulley 32 about which a drive belt 34 is trained. The belt 34 is suitably driven by conventional motor means which may be connected to, for example, a variable speed transmission whereby the rate of rotation of the mixing device may be readily controlled.

Details of the material feeding mechanism at the material inlet end of the device illustrated in FIG. 1 is more clearly illustrated in FIG. 3. Referring particularly to FIG. 3, it will be noted that cylindrical end or hub member 14 is mounted in the support member generally designated 18 by antifriction bearing means 36. The inlet chute 22 communicates at end 38 to a continuous or intermittent supply of material which supply means forms no specific part of the present invention. The other end of the chute discharges material in the lower curvilinear surface of the cylindrical hub member 14 inboard of an annular flange 40 which assists in directing the material flowing from the end of the inlet chute 22 into the introduction chamber 26. Further, the cylindrical hub member 14 is provided with adjustable gate means generally designated 40'. The adjustable gate means 40' includes a fixed web member 42 secured such as by welding to the inner curved surface of the hub 14 and a pair of adjustable gates 44 and 46, the relative positions of which determine the area of the inlet passage 48. The adjustable gates 44 and 46 and the baffle portion 42 also function to restrict outflow of material from this end of the mixing chamber during rotation of the device.

The material introduction chamber 26 is provided with a closure cap or spider 50 which centrally supports a vertically extending stem member 52 which carries a disc 54 having, where desired, a sealing member 56 about its peripheral edge. The vertically extending stem portion 52 is threaded substantially throughout its length and mating threads are provided on a cooperating nut or follower 58 which is connected to the disc member 54 whereby upon rotation of the stem 52 the distance between the disc 54 and the closure cap 50 is effectively adjusted. The adjustment of the disc is important in establishing control of the rate of throughput of material within the device and also for the control of quantity of material held within the mixer during operation thereof as to be more fully described hereinafter.

Referring particularly to FIG. 4, where the opposite or discharge end of the mechanism illustrated in FIG. 1 is more clearly illustrated, the cylindrical discharge chamber 28 is provided with a cap member 60 fitted with a rotatably mounted shaft 62 which adjustably supports disc 64 provided with a sealing band 66. The cylindrical hub member 16, like cylindrical hub member 14, is provided with an anti-friction bearing means 68 which rotatably mounts said end to the support member 20. A discharge chute member 24 at the discharge end includes a fixed standard or baffle member 70 secured such as by welding to a portion of the cylindrical inner surface of the hub member 16. The baffle 70 adjustably supports a further baffle member 72 which projects into the zone of the discharge chamber 28. The position of projection of the adjustable baffle 72 may be varied by suitable separable fasteners generally designated 74. The material directed onto the upper extension of the adjustable baffle 72 passes from the hub member 16 into a collecting vessel or the like 76.

The above described device is in effect a series of V-type blenders or mixers mounted end-to-end and the overall structure has a generally zig-zag three-dimensional configuration. Preferably, the mixer 10 is mounted on a horizontal axis and the feed which is introduced at one end 14 falls into the introduction chamber 26. As the unit 10 rotates on its axis, the mass of unmixed material in the introduction chamber 26 falls into the first V 30a. On the next half-rotation of the unit 10, the material collected in the bottom of the first V 30a is divided generally half into the introduction chamber 26 and half into the next V section 30b. On the next half-revolution, material is again divided half and half and this operation of dividing and recombining continues throughout the entire cycle of operation and throughout the plural mixing or blending zones of the device.

The discharge chamber 28, which as hereinbefore described, is comparable in design and in function with the material introduction chamber 26 receives mixed material just passed through the plural mixing zones when the discharge chamber is in a downward position as illustrated in FIG. 1. As the unit 10 rotates and the discharge chamber 28 is brought up into the vertical position material will fall down and some of the material will be caught on the discharge chute 72 and directed thereby into the receptacle 76.

Rate of movement of the material being mixed and conveyed through the mixer may be variously controlled on a given diameter unit operating at a pre-established optimum rate of rotation by several different means. For example, the axis of rotation of the mixing chamber may have a small gradient from the material receiving end to the material discharge end. This gradient or slope may be made adjustable to provide for variable flow rates where desired. Suitable adjusting means may be readily incorporated in the bearing support members 18 and 20.

It will also be appreciated that the rate of flow of material through the chamber may be varied by the installation of one or more butterfly baffles or the like 82a, b, c, d, e, f and g provided with external control handles 84a, b, c, d, e, f and g, respectively. These butterflies 82a through g may be adjusted to effectively increase or, if desired, decrease the amount of material which is moved from one V unit or mixing zone into the next V unit or mixing zone during rotation of the mixing chamber 10.

A problem inherent in continuous mixing machines which does not exist in batch type mixers is associated with the quantity of holdup material in each V unit. In the batch type machine, quantity of holdup is controlled by the quantity of material which is batch-fed into the unit and this quantity of material does not change throughout the entire mixing cycle. On the other hand, with the continuous mixer of the invention, material is moving alternately from one V unit into the next and on the next revolution, a portion of the material is returned to the first V unit, etc. If there existed some type of blockage on a given V unit, the result would be a large accumulation of material in the preceding V unit and this would then stepwise be accumulated throughout the entire length of the continuous mixing chamber. Further, if there should exist a more rapid rate of movement from one V unit to the other, there would result a gradual depletion of material in the preceding V units.

In general, quantity of holdup in the present continuous mixer may be readily controlled by the adjustment of the piston or disc in the introductory chamber and the discharge chamber. Further, where the continuous mixer is designed with a substantial number of V units, an intermediate control chamber similar in design to the introduction or discharge chamber may be installed at a desired intermediate point or points along the continuous chamber.

The operation of the holdup control is relatively simple in principle; considering V unit 30a which is immediately downstream from the introductory chamber 26 when this V unit is in the "up" position, the entering chamber and V section 30b are both in the "down" position and material will flow from V unit 30a into the introductory chamber. Likewise, material will flow from V unit 30a into V section 30b and the division of quantity of material from V unit 30a into the introductory chamber and V unit 30b should be about 50–50 with the butterfly control member 82a positioned as illustrated in FIG. 3. By varying the position of the butterfly 82a, introduction of a greater or lesser portion into V unit 30b may be brought about.

On the next half-revolution, the introductory chamber will have moved into the "up" position and V unit 30a will have moved into the "down" position. Substantially all of the material that was in the introductory chamber will flow into the first V unit 30a and at the same time about one-half of the material from V unit 30b will flow into V unit 30a. It will, therefore, be apparent that the quantity of material held in the introductory chamber will have a definite ratio to that which is maintained in V units 30a through 30g.

Similarly, the quantity of material maintained in the discharge chamber 28 will, in general, be equal to half of the material in the last V section 30g less the quantity of material which is directed from the discharge chamber via the discharge chute 72.

The quantity of material held in the next to the last V unit 30f will then be substantially equal to about 50% of the material in V section 30g plus the material in the discharge chamber 28 minus the material which is removed via the chute 72.

Where the capacities of the introductory and the withdrawal chambers are the same, a substantially uniform quantity of material is maintained in each of the V sections of the mixing chamber. However, if the quantity of material in the introductory chamber is adjusted to hold an appreciably smaller amount than that held in the discharge chamber, there would result a gradient in the quantity of material held in the intermediate sections. Thus, it would be possible to operate with only a small quantity of material in the initial section and a greater quantity of material in the final sections, or, conversely, the device may be operated to retain a small quantity of material in the discharge sections and a larger amount of material in the entering sections. Such changes are desirable, depending upon the resistance to mixing of the particular material to be mixed. Thus, if the initial mixing is more difficult than the final mixing of the given material, adjustment may be made in the device such that the smaller quantity of material is held in the introductory section. If, on the other hand, the most difficult mixing occurs after the mixing approaches completion, then it would be preferable to maintain a smaller quantity of material in the discharge section. It will further be appreciated that by installing, in the unit illustrated in FIG. 1, a retaining chamber similar to chambers 26 or 28 at some intermediate mixing zone then control of quantity of material may be varied at selected points along the mixing chamber.

In the illustrated form of the invention, each of the V sections is provided with end flanges 80 permitting the simple assembly or disassembly of the units. This form of construction has particular utility as it is readily possible to either increase or decrease the number of sections in a mixer and to vary the size, the radial direction of projection and the form of certain sections within a given unit.

The number of sections employed in the continuous mixer of the invention is a function of a plurality of variables such as; desired rate of material flowthrough, desired degree of mixing, the difficulties of mixing a particular material, and the desired gradient of concentration holdup in a given section. It may be desirable to have a substantial number of intermediate sections or only a small number of intermediate sections depending upon the particular material to be processed.

Where a continuous mixer is to be employed for a substantial period of time on a single operation, the mixer may be more inexpensively manufactured by welding the determined number of sections together.

Many instances arise in industrial operation where it is desirable or essential that the mixing equipment be thoroughly cleaned at stated periods. Generally, in a properly functioning continuous mixer constructed in accordance with the present invention there should be very little accumulation of material at any point over an extended period of time. Further, if an inert component of the materials to be mixed has any abrasive or cleaning action, the inert component acts as a continuous cleaner as it passes through the mixing chamber. Therefore, it is readily possible to completely clean the unit by passing only the inert material through the mixer. It is also conceived that the mixer may be conveniently cleaned, particularly on small installations, by positioning the axis of rotation generally vertical and vibrating or hammering the unit to remove particulate material from within the mixing chamber.

It is also contemplated that each of the V sections 30a through g may be provided with a removable cleanout port through which the interior of the sections may be emptied of material employed during a mixing operation and through which, if desired, the internal surfaces of the chambers may be cleaned with suitable detergents and the like.

From the foregoing description of the apparatus shown in FIGS. 1, 3 and 4, it will be apparent to those skilled in the art that a particularly advantageous continuous feed and discharge mixer-conveyor is provided. It is contemplated that various modifications may be made in the form of the device without departing from the scope of the present invention. For example, in FIG. 2, there is illustrated a modified form of the continuous mixer illustrated in FIG. 1 wherein each of the plural mixing zones of the continuous mixing chamber has a generally Y-shaped configuration whereby the apices of each of the V units illustrated in FIG. 2 is provided with a flat bottom generally cylindrical storage chamber generally designated 90a through g, respectively. The chambers 90a through 90g are similar in form to the introductory and removal chambers 26' and 28'. Each of the portions 90a through 90g may also be provided with adjustable piston or disc type regulating means to permit variations in the holdup quantity of material in predetermined zones of the continuous mixer.

In the form of the invention illustrated in FIG. 2, flow control butterflies or baffles 82a' through 82g' may be conveniently employed and as in the form of the invention illustrated in FIG. 1 cylindrical hubs 14' and 16' suitably mount the mixer 10' for rotation in bearings carried by the support elements 18' and 20'.

The continuous mixing apparatus illustrated in FIGS. 1 through 4 are particularly adapted for mixing of solids with solids. However, as indicated hereinbefore, the principles of the present invention are equally adaptable to treatment of liquids with liquids, liquids with solids, solids with gases, and liquids with gases.

In liquid-liquid contacting operations, it is the common practice to pass two or more immiscible or near-immiscible liquids through a series of stages either in parallel or in counterflow arrangement. Between each of the stages it is a normal practice to provide some form of agitations such that all portions of one phase have an opportunity to come into intimate contact with some portion of another phase. Further, it is desirable within each stage to permit the liquids to stand undisturbed for a period of time sufficient to allow the heavier phase to settle to the bottom and the lighter phase to accumulate at the top.

In FIGS. 5 and 6 there is illustrated suitable end members with feed and discharge means for liquid-liquid mixing and phase separation for use with the continuous mixers illustrated in FIGS. 1 and 2. In FIGS. 5 and 6 the continuous mixer 110 is constructed of a plurality of V-shaped segments, the end segments 130a and 130g being illustrated. A cylindrical hub portion 114 is secured to V section 130a together with a retention chamber 126. The cylindrical hub member 114 is mounted for rotation in suitable bearing means connected to a fixed support 118. The continuous mixer is rotated either continuously or intermittently by attaching the pulley 132 to a suitable prime mover.

The other end zone 130g is provided with a cylindrical hub member 116 and a storage chamber 128. The hub member 116 is mounted in bearing means 168' suitably carried by support member 120.

A partition member 115 is mounted within the cylindrical hub member 114 and has secured thereto a conduit 117, the inner end of which is connected to the heavy phase drawoff conduit 119. The lower end of conduit 119 is provided with a slidable or telescopic sleeve 121 having a plurality of openings 123 at the lower end thereof. The position of the telescopic sleeve 121 is determined by the position of the disc member 154 which is adjustably mounted on shaft 152 in a manner similar to that described with reference to the structures shown in FIG. 3 of the drawings. As the disc 154 is urged upwardly or downwardly from its illustrated position, the sleeve 121 moves relative to the fixed downpipe 119.

Spider means 125 supports a concentric conduit 127 provided with an offtake conduit 129 illustrated in FIG. 5 as being directed in a direction opposite to the direction of the projection of conduit 119. The extended ends of conduits 117 and 127 have connection to a conventional rotary swivel joint and thence to suitable pump means for withdrawing from and supplying fluids to conduits 117 and 127, respectively.

The opposite end of the liquid-liquid mixing device is similar in construction and a baffle member 131 is secured within the cylindrical hub member 116. The baffle 131 has secured thereto an offtake conduit 133 provided with an end member 135 which end member is provided with an adjustable end fitting 137 provided with a plurality of liquid drawoff openings 139.

Chamber 128, like chamber 126, is provided with a piston or disc member 168 mounted for movement within the chamber 128 on shaft 162. Spider means 141 support an inlet conduit 143 and conduits 143 and 133 are suitably connected to conventional swivel joint means, thence these conduits have connection to pump means or the like for directing fluid into and through the conduit 143 and from the chamber 128 via conduit 133.

In application of the continuous mixer, which is preferably mounted in a substantially horizontal position, in the same manner as the solid-solid mixing device as illustrated in FIGS. 1 through 4, the mixing chamber is either rotated continuously or rotation thereof may be cycled between rotating and stationary. If the two liquids countercurrently passing through the mixing device separate readily generally no stationary period is required. If, on the other hand, the phases resist separation and if separation were particularly essential to the process being carried out in the device, the stationary period may be utilized to promote or encourage the required separation.

In operation of the countercurrent liquid-liquid treating device illustrated in FIGS. 5 and 6, the heavier of the liquids 151 is introduced into the treating chamber through conduit 143 and the lighter of the components 153 is withdrawn from chamber 128 through conduit 133, having the adjustable end member 137. At the opposite end of the device, the lighter component 153 is introduced into the treating chamber through conduit 127 and the heavier of the liquids is withdrawn via conduit 117 provided with the adjustable end piece 121.

Withdrawal of the heavier component from compartment 126 and withdrawal of the lighter component from chamber 128 is preferably intermittent whereby withdrawal only takes place when the compartments 126 and 128 are in the "down" position as illustrated in FIGS. 5 and 6. Further, it is advantageous to only introduce the liquids into the chamber through conduits 127 and 143 when the treating chamber is rotated 180° from the position illustrated in FIGS. 5 and 6. This aids in eliminating withdrawal of fluids immediately following their introduction and before the fluids have passed from one end to the opposite end of the treating chamber. The intermittent introduction of fluids may be cycled through switch and pump means or where the inlet pipe 127 is provided with an upstanding discharge end 129, flow and interruption of flow may be conveniently brought about by maintaining a reservoir of supply liquid at a level just below the extended end of the discharge end 129 of the inlet pipe whereby no flow results when the pipe is positioned as illustrated in FIG. 5 and flow only commences as the discharge end 129 is directed in the "down" direction upon rotation of the treating chamber and its connected pipe.

It will be apparent to those skilled in the art that while the apparatus specifically illustrated in FIGS. 5 and 6 is primarily adapted for counterflow liquid-liquid treating, both of the liquids 151 and 153 may be introduced at one end and both of the liquids withdrawn at the opposite end by merely, for example, attaching downwardly projecting conduit 119 with its adjustable end piece 121 to, for example, conduit 143 at the opposite end so that the heavy and light liquids are simultaneously withdrawn from chamber 128.

Referring specifically to FIGS. 7 and 8, a further modification of the present invention is illustrated having particular utility for the treatment of solids with liquids in counterflow relationship. The treating chamber 210 has ends 230a and 230g each of which is provided with a hollow cylindrical hub 214 and 216, respectively.

Hub 214 is rotatably mounted in bearing means 236 supported by bearing support means 218 as previously described with reference to FIGS. 1 through 6.

End 230a of the treating chamber is also provided with a retention chamber 226 as previously described with reference to the other forms of the invention. The chamber has adjustably mounted therein a movable piston 254.

An annular baffle member 211 is mounted within the cylindrical hub 214 and carries at its inward end a screen type baffle member 215. The perforated baffle 215 provides for the removal of the solid particular material being treated in the chamber and separates the liquid component therefrom as the chamber 210 rotates about the bearing means 236 and 268. Concentrically mounted within the opening 217, in the annular baffle 211, is a treating liquid inlet conduit 219 provided with an inwardly curved end portion 221.

At the opposite end of the treating device the cylindrical hub portion 216 is rotatably mounted in bearing means 268 suitably supported by bearing support means 220. A perforated baffle 223 is mounted within the cylindrical hub member 216 with the openings therein sized to prevent the passage of the particulate solid material therethrough. Centrally disposed through the perforated baffle 223 is a duct 225 provided with an internal screw member 227. End 230g of the device is also provided with a storage compartment 228 having mounted therein an adjustable piston member 268 whereby the quantity of holdup of material may be readily adjusted.

In operation of this form of device, the screw mechanism 227 feeds at a predetermined rate solid particulate material into the retention chamber 228. At the opposite end fluid to be mixed with or treated by the solid particulate material is fed into chamber 226 via conduit 219. As the device continues to rotate, the solid particles are conveyed toward outlet baffle means 215 and the liquid is transferred toward outlet screen member 223. The screens or baffles 215 and 223 assist in removal of the solid particles through outlet opening 217 and liquid through the cylindrical hub portion 216.

While various forms of the present invention have been specifically described and shown in the application, the description and illustrations are for purposes of illustrating the principles of the invention and are not to be construed as limitations thereof as other mechanical arrangements and uses of the novel continuous flow treating device may be constructed within the scope of the present invention. For example, it is contemplated that the devices shown, for example, in FIGS. 1 and 2 would have particular utility in the drying of particulate material by passing in countercurrent relationship a particulate material to be dried and a drying gas maintained at a suitable drying temperature and the chambers or units need not be 180° displaced as the radical direction of projection of the blending chambers may be varied without departing from the teachings of this invention.

In the specification and claims the term treating includes mixing, blending, leaching, heating, cooling, distilling, extracting and other contacting operations particularly those involving a plurality of phases.

I claim:

1. In a continuous mixing device having an elongated chamber of undulant shape formed to define a plurality of serially arranged blending zones and mounted for rotation about its general longitudinal axis, the improvement comprising:

a flow control valve including a transversely disposed adjustable baffle in at least one of said blending zones.

2. A device in accordance with claim 1 wherein said adjustable baffle comprises a butterfly disposed at the intersection of each of said zones, said butterfly being pivotal from a position substantially parallel to the general longitudinal axis of said chamber to a position substantially normal thereto to control the quantity of material passed thereby upon rotation of said chamber.

3. In a continuous mixing device having an open-ended elongated chamber of undulant form mounted for rotation about the general longitudinal axis thereof, the improvement comprising:

material feed and discharge volume control means disposed at least proximate each end of said elongated chamber to independently regulate the volume of material passed thereby upon rotation of said elongated chamber.

4. A device in accordance with claim 3 wherein said control means comprises a holdup chamber communicative with and disposed substantially normal to the general longitudinal axis of said elongated chamber, and means to vary the volume of said holdup chamber.

5. A device in accordance with claim 4 wherein said means to vary the volume comprises a piston slidably disposed in said holdup chamber and means to adjustably fix the longitudinal location of said piston in said holdup chamber.

6. In a countercurrent fluid-to-fluid treating device adapted to contact a light-phase fluid with a heavy-phase fluid and having a closed-ended elongated chamber of undulant shape mounted for rotation about the general longitudinal axis thereof, the improvement comprising:

first and second storage chambers communicative with and disposed substantially normal to the general longitudinal axis of said elongated chamber proximate the ends thereof;

a first inlet conduit means mounted to rotate with said elongated chamber and disposed through one end thereof above and directed away from said first storage chamber for feeding said light-phase fluid into said elongated chamber;

a heavy-phase draw-off conduit mounted to rotate with said elongated chamber through said one end and directed into said first storage chamber terminating proximate the bottom thereof;

a second inlet conduit means disposed through the other end of said elongated chamber above said second storage chamber for feeding the heavy-phase fluid into said elongated chamber; and a light-phase off-take conduit mounted to rotate with said elongated chamber and disposed through said other end above and directed into said second storage chamber and terminating proximate the upper portion thereof for taking off the light-phase fluid therefrom.

7. A device in accordance with claim 6 wherein means are provided to vary the volume of said storage chambers.

8. In a countercurrent fluid-to-solid treating device having an elongated chamber of undulant shape mounted for rotation about the general longitudinal axis thereof, the improvement comprising:

first and second retention chambers communicative with and disposed substantially normal to the general longitudinal axis of said elongated chamber proximate the ends thereof;

a solid material discharge opening disposed in one end of said elongated chamber, a foraminous baffle extending into said elongated chamber from the side of said opening opposite said first retention chamber and then into said first retention chamber to block all but indirect flow of solid material from said elongated chamber through said first retention chamber to said discharge opening;

a fluid inlet conduit disposed through said one end of said elongated chamber terminating above said first retention chamber for feeding fluid thereto;

a solid material feeding means disposed through the other end of said elongated chamber and terminating above said second retention chamber; and a fluid material discharge opening in said other end of said elongated chamber, said fluid material discharge opening having a perforated baffle therein for blocking flow of solid material therethrough.

9. A device in accordance with claim 8 wherein said retention chambers are provided with means to vary the volume thereof.

10. A device in accordance with claim 9 wherein said solid material discharge opening comprises a frustoconical opening coaxially disposed to the general longitudinal axis of said elongated chamber, the minor diameter end of said opening being disposed most proximate said first retention chamber.

11. A device in accordance with claim 10 wherein said fluid inlet conduit is coaxial with said solid material discharge opening and disposed to rotate with said elongated chamber, the terminal portion of said fluid inlet conduit extending toward said retention chamber.

12. A device in accordance with claim 11 wherein said solid material feeding means comprises a duct coaxially mounted with respect to the general longitudinal axis of said elongated chamber, and a screw conveyor means mounted in said duct to convey solid material into said elongated chamber.

13. A device in accordance with claim 12 wherein said fluid material discharge opening is disposed coaxial to said duct, and wherein said perforated baffle is annular and bridge the space between said duct and the walls defining said liquid material discharge opening.

References Cited

UNITED STATES PATENTS

| | | | |
|---|---|---|---|
| 977,897 | 12/1910 | Nims | 259—175 |
| 1,129,102 | 2/1915 | Judd | 259—3 |

WALTER A. SCHEEL, *Primary Examiner.*

LEO QUACKENBUSH, *Examiner.*

J. M. BELL, *Assistant Examiner.*